Oct. 25, 1949.　　　L. BISHOP　　　2,485,545
HAND TRUCK
Filed Feb. 18, 1948　　　2 Sheets-Sheet 1
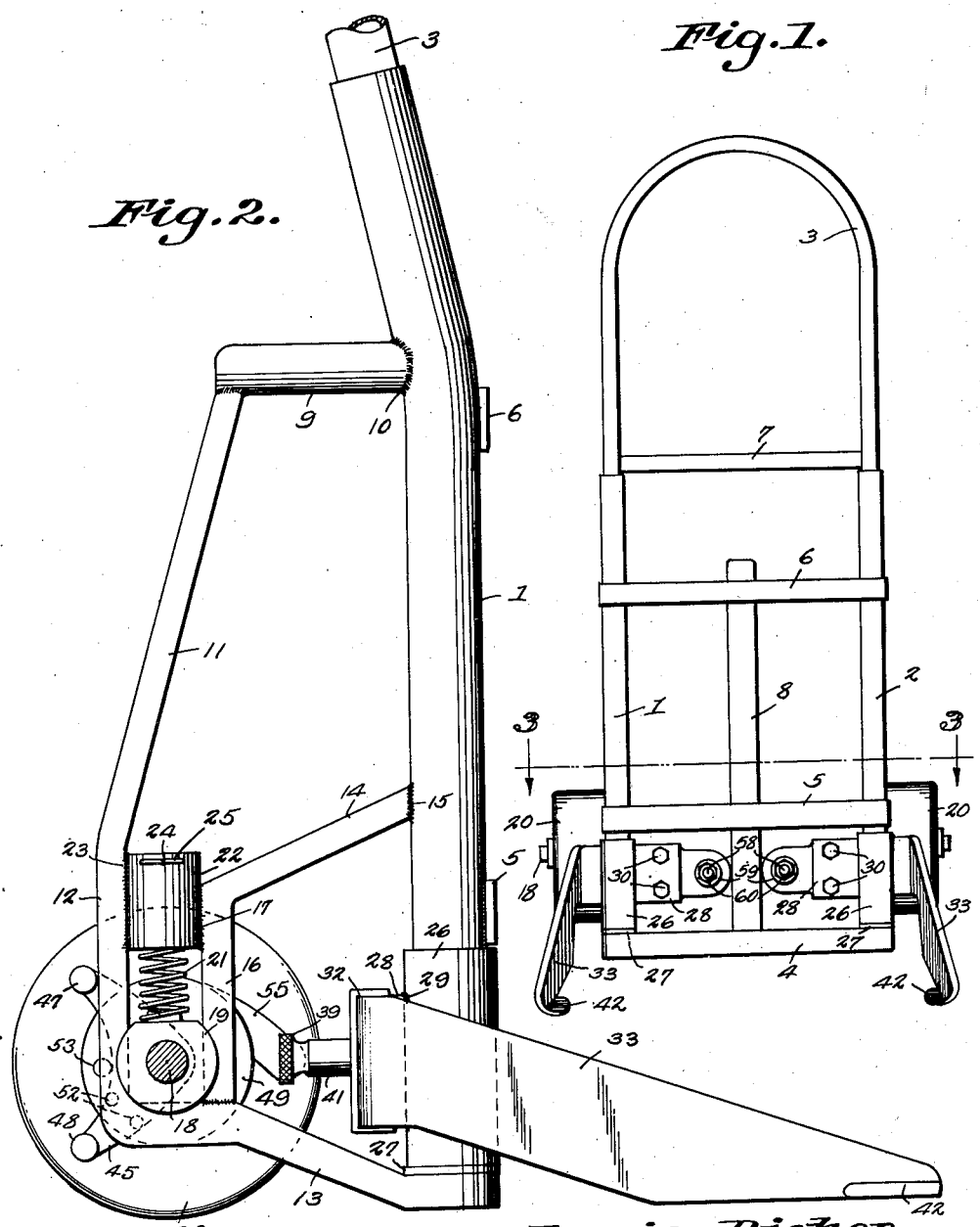
Lewis Bishop
INVENTOR
BY C.A.Snow&Co.
ATTORNEYS.

Oct. 25, 1949.    L. BISHOP    2,485,545
HAND TRUCK
Filed Feb. 18, 1948    2 Sheets-Sheet 2
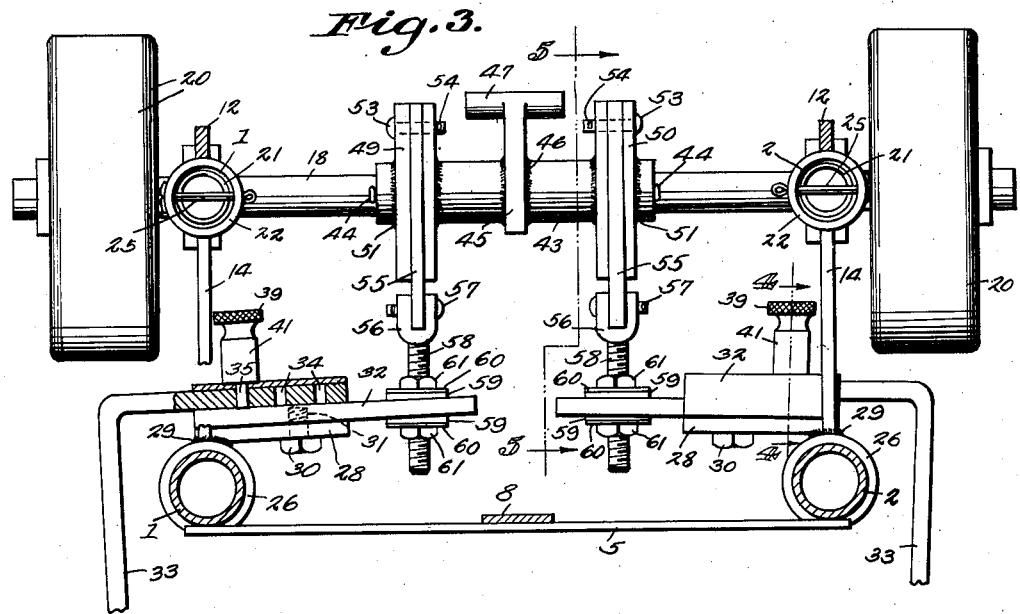
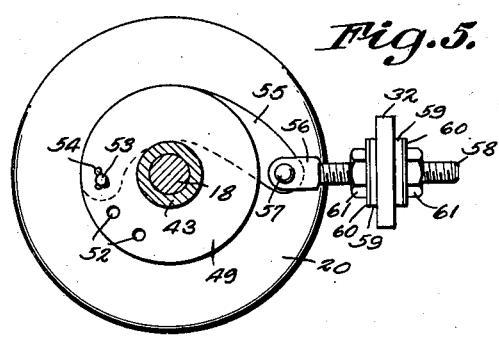
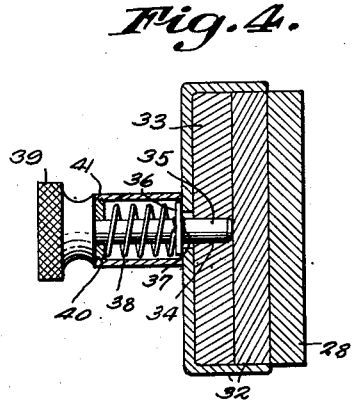
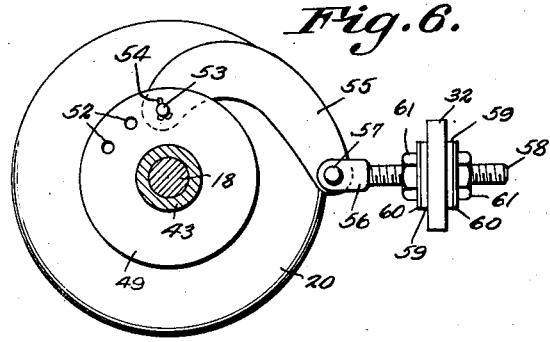
Lewis Bishop
INVENTOR
BY *CA Snow & Co.*
ATTORNEYS.

Patented Oct. 25, 1949

2,485,545

UNITED STATES PATENT OFFICE 2,485,545

HAND TRUCK

Lewis Bishop, Arcadia, Fla.

Application February 18, 1948, Serial No. 9,228

4 Claims. (Cl. 214—65.5)

This invention relates to improvements in hand trucks.

An object of the invention is to provide an improved form of two-wheel hand truck.

Another object of the invention is to provide an improved two-wheel type hand truck which will have adjustable means for supporting an article while being moved by the truck.

A further object of the invention is to provide an improved two-wheel type hand truck which will be provided with a pair of vertically pivoted horizontally swingable article engaging arms.

A still further object of the invention is to provide an improved two-wheel type hand truck which will be provided with a pair of vertically pivoted horizontally swingable article engaging arms, and means connected therewith for receiving the article engaging arms in clamped position upon an article.

Another object of the invention is to provide an improved two-wheel type hand truck which will be highly efficient in operation, and relatively inexpensive to manufacture and produce.

Other objects will appear as the description proceeds.

In the accompanying drawings which form a part of this application,

Figure 1 is a front elevation of the improved two-wheel hand truck.

Fig. 2 is an enlarged side elevation of the lower portion of the two-wheel hand truck.

Fig. 3 is a sectional view taken on the line 3—3 of Fig. 1.

Fig. 4 is a sectional view taken on the line 4—4 of Fig. 3.

Fig. 5 is a partial sectional view taken on the line 5—5 of Fig. 3.

Fig. 6 is a similar view to that shown in Fig. 5, except that the arcuate actuating arm is in extended position.

Like characters of reference are used throughout the following specification and the accompanying drawings to designate corresponding parts.

In carrying out the invention, there is provided an improved hand truck including a body formed by two parallel vertically extending tubular frame members 1 and 2 which are transversely spaced, and are extended rearwardly adjacent their upper ends. An inverted U-shape handle bar 3 is secured in the upper ends of the frame members 1 and 2.

Three transversely extending vertically spaced bracing strips 4, 5 and 6 are secured to the front edges of the frame members 1 and 2, preferably by spot welding. A cross brace bar 7 is connected between the side arms of the inverted U-shape handle bar 3 adjacent their points of connection with said frame members 1 and 2.

A vertically extending bracing strip 8 is secured by welding to the rear surfaces of the bracing strips 4, 5 and 6, intermediate their ends.

Rearwardly extending frame arms 9 are welded at 10 to the frame members 1 and 2, and support the parallel downwardly and rearwardly extending arms 11, whose lower ends 12 are bent to extend in parallel relation with the frame members 1 and 2. The lower ends of the arms 12 extend forwardly and downwardly as at 13 and are connected with the lower ends of the frame members 1 and 2.

A pair of bracing arms 14 are welded at 15 to the rear surfaces of the frame members 1 and 2 and extend rearwardly, with their lower ends 16 extending downwardly in parallel relation to the ends 12 of the arms 11, and their ends welded at 17 to the extensions 13 of the ends 12 of said arms 11.

A tranversely extending axle 18 is mounted for rotation in the bearings 19, which are in turn disposed for vertical adjustment between the parallel ends 12 of the arms 11 and the lower ends 16 of the bracing arms 14.

Supporting wheels 20 are supported upon the opposite ends of the axle 18. Heavy coil springs 21 are positioned with their lower ends contacting the bearings 19 and have their upper ends received within the tubular spring receiving housings 22 welded at 23 to the ends 12 of the arms 11. The housings 22 are apertured at 24 to receive the cross extending cotter pins 25 for holding the springs 21 within said housings 22, thereby providing a resilient vertical adjustment or bearing for the axle 18 and the wheels 20.

Bearing collars 26 are rotatably supported upon the lower ends of the tubular frame members 1 and 2 with their lower ends engaging and bearing on the washers 27.

Inwardly directed carrier arm supporting plates 28 are welded at 29 to the rear surfaces of the bearing collars 26, and are apertured at 29 to receive the bolts 30 which extend through apertures 31 in the inwardly directed carrier arm supporting channel plates 32.

Substantially L-shape carrier or load supporting arms 33 are provided with their inwardly extending base portions being adjustably supported in the channel plates 32, and are formed with a plurality of spaced apertures 34 through which the locking plungers 35 may extend. The locking plungers 35 support the washers 36 welded at 37 thereto, and also have coil springs 38 disposed thereabout between said washers 36 and the knurled operating heads 39 secured to the outer ends of the plungers 35. The heads 39 are threaded at 40 to be secured in the threaded outer ends of the housings 41 secured to the channel plates 32. In operating the heads 38 will be unscrewed and the plungers 35 pulled outwardly against the tension of the coil springs 38 while the carrier or load supporting arms 33 are being adjusted.

The forwardly extending portions of the carrier or load supporting arms 33 are outwardly tapered, lying in a vertical plane, and are formed with the inwardly extending horizontal oppositely disposed article engaging and supporting ears 42 at their outer ends for slipping under the article to be picked up and carried by the truck.

A tubular sleeve 43 is rotatably mounted about the central portion of the axle 18 and is held from endwise movement by the cotter pins 44. An arcuate actuating arm 45 for the carrier or load supporting arms 33 is welded at 46 to the sleeve 43, extending rearwardly therefrom in a vertical plane, and is formed with the transverse foot supporting bars or pedals 47 and 48 respectively disposed on the upper and lower ends thereof.

Peripherally grooved lock cylinders 49 and 50 are welded at 51 to the sleeve 43 and are formed with a plurality of spaced circumferentially disposed openings 52, through which the headed pins 53 may extend, to be held in place by the cotter pins 54.

Arcuate actuating arms 55 are apertured at their opposite ends, and are arranged so that they will have their rear ends supported on the pins 53 in the peripheral grooves in the lock cylinders 49 and 50. A clevis 56 is attached to the forward end of each actuating arm 55 by the pins 57, and threaded bolts 58 are formed integrally with each clevis 56.

The bolts 58 extend through openings (not shown) in the inner ends of the L-shape carrier or load supporting arms 33, and sleeves 59 are disposed on the bolts 58 at the sides of the arms 33, being held in position by means of the washers 60 and nuts 61, thus providing a universal joint for the connection with the arms 33.

In operation when a load is to be lifted, the truck will be wheeled to a point near the load and the foot pedal 47 is pushed forwardly, thereby opening the carrier or load supporting arms 33. After this, the arm 33 will have their ear portions 42 slipped under the load (not shown) as the pedal 48 is pushed downwardly, which action causes the arms 33 to move inwardly to clamp against the load, and moves the arcuate actuating arms 55 rearwardly past dead center to lock the arms 33 in clamped position. As the handle bar 3 is tilted rearwardly, the axle 18 will come up against the tension of the springs 21 until the load is balanced.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. A hand truck comprising a body having parallel main frame members, a handle bar at the upper end thereof, a vertically adjustable resiliently mounted axle at the lower end of said frame members, wheels on said axle, load carrier arms rotatably mounted on the lower ends of said frame members, means for adjusting said arms in a lateral direction, means rotatably mounted on said axle for actuating said load carrier arms, said means for actuating said load carrier arms including a sleeve rotatably disposed on said axle, peripherally grooved lock cylinders on said sleeve, and adjustable connections between said lock cylinders and said load carrier arms.

2. A hand truck comprising a body having parallel main frame members, a handle bar at the upper end thereof, a vertically adjustable resiliently mounted axle at the lower end of said frame members, wheels on said axle, load carrier arms rotatably mounted on the lower ends of said frame members, means for adjusting said arms in a lateral direction, means rotatably mounted on said axle for actuating said load carrier arms, said means for actuating said load carrier arms including a sleeve rotatably disposed about said axle, peripherally grooved lock cylinders on said sleeve, adjustable connections between said lock cylinders and said load carrier arms, and universal joints between said connections and said load carrier arms.

3. A hand truck comprising a body having parallel main frame members, a handle bar at the upper end thereof, a vertically adjustable resiliently mounted axle at the lower end of said frame members, wheels on said axle, load carrier arms rotatably mounted on the lower ends of said frame members, means for adjusting said arms in a lateral direction, means rotatably mounted on said axle for actuating said load carrier arms, said means for actuating said load carrier arms including a sleeve rotatably disposed about said axle, spaced peripherally grooved lock cylinders on said sleeve, arcuate adjustable connections between said lock cylinder and said load carrier arms, universal joints between said connections and said load carrier arms, and arcuate foot actuating pedals on said sleeve for moving said adjustable connections past dead center to lock said load carrier arms in load clamping position and for releasing said load carrier arms when moved in the reverse direction.

4. A hand truck comprising a body having parallel main frame members, a handle bar at the upper end thereof, a vertically adjustable resiliently mounted axle at the lower end of said frame members, wheels on said axle, load carrier arms rotatably mounted on the lower ends of said frame members, means for adjusting said arms in a lateral direction, means rotatably mounted on said axle for actuating said load carrier arms, said means for actuating said load carrier arms including a sleeve rotatably disposed on said axle, peripherally grooved lock cylinders on said sleeve, and connections between said lock cylinders and said load carrier arms.

LEWIS BISHOP.

REFERENCES CITED

The following references are of record in the file of this patent:

UNITED STATES PATENTS

| Number | Name | Date |
|---|---|---|
| 862,194 | Parker | Aug. 6, 1907 |
| 1,193,729 | Stebler | Aug. 8, 1916 |
| 1,551,928 | Bryan | Sept. 1, 1925 |
| 2,062,498 | Byington | Dec. 1, 1936 |

FOREIGN PATENTS

| Number | Country | Date |
|---|---|---|
| 282,214 | Great Britain | Dec. 22, 1927 |